(12) United States Patent
Clark (10) Patent No.: US 11,022,773 B2
(45) Date of Patent: Jun. 1, 2021

(54) MAGNETIC LENS FILTER SYSTEM

(71) Applicant: Graham Clark, Lakewood, CO (US)

(72) Inventor: Graham Clark, Lakewood, CO (US)

(73) Assignee: Colorado Tripod Company, LLC

( * ) Notice: Subject to any disclaimer, the term of this patent is extended or adjusted under 35 U.S.C. 154(b) by 179 days.

(21) Appl. No.: 16/034,662

(22) Filed: Jul. 13, 2018

(65) Prior Publication Data

US 2020/0018918 A1 Jan. 16, 2020

(51) Int. Cl.
*G02B 7/00* (2021.01)
*G03B 17/14* (2021.01)

(52) U.S. Cl.
CPC ............. *G02B 7/006* (2013.01); *G03B 17/14* (2013.01)

(58) Field of Classification Search
CPC .......... G03B 17/14; G03B 17/56; G03B 5/00; G03B 17/566; G03B 17/12; G03B 17/561; G02B 7/006
USPC ........................................................ 359/892
See application file for complete search history.

(56) References Cited

U.S. PATENT DOCUMENTS

| 10,393,988 | B2 * | 8/2019 | Clark | G03B 11/00 |
| 2013/0242390 | A1 * | 9/2013 | Nomura | G02B 27/281 |
| | | | | 359/483.01 |
| 2015/0268440 | A1 * | 9/2015 | Sofka | G02B 7/005 |
| | | | | 74/63 |
| 2016/0216474 | A1 * | 7/2016 | Kobayashi | G03B 11/00 |
| 2017/0192193 | A1 * | 7/2017 | Yuan | G02B 7/004 |
| 2018/0210223 | A1 * | 7/2018 | Sharp | H04N 5/2252 |

* cited by examiner

*Primary Examiner* — Jade R Chwasz
(74) *Attorney, Agent, or Firm* — Johan Eide; Christopher Pilling; My Patent Guys (57) ABSTRACT

A magnetic lens filter system includes an external rotational element having a plurality of ridges allowing a photographer to grip and rotate the external rotational element. A plurality of gears is in engagement with the external rotational element, and an inner gear connected to an inner rotational element such that when the external rotational element is rotated the inner rotational element rotates. Advantageously, a rotatable magnetic element is configured to rotate simultaneously with the inner rotational element. The system is configured to accept a removable lens filter. The removable lens filter has a magnetic element configured to attach to the rotatable magnetic element.

8 Claims, 10 Drawing Sheets

MAGNETIC LENS FILTER SYSTEM

CROSS-REFERENCE TO RELATED APPLICATIONS

N/A

BACKGROUND OF THE INVENTION

1. Field of the Invention

The present invention relates to camera filters, and more specifically a magnetic lens filter system.

2. Description of Related Art

In the art of camera lens filters, also called lens filters or photography filters, there has been very limited advancement in the field. In advanced photography practices, photography filters are useful for a variety of reasons. In addition to providing a protective lens for a camera lens, photography filters modify the images captured with a camera, including enhancing color, reducing reflections, or aiding in capturing scenery in extremely difficult lighting conditions.

BRIEF SUMMARY OF THE INVENTION

In one embodiment of the present invention a magnetic lens filter system is provided, comprising a primary structural member including an attachment ring and a flange; an external rotational element having a plurality of ridges, the external rotational element attached to the primary structural member; a plurality of gears positioned in a plurality of gear positioning structures provided in the primary structural member, wherein the plurality of gears is in engagement with the external rotational element; an inner rotational element having an inner gear in engagement with the plurality of gears such that when the external rotational element is rotated the inner rotational element rotates, wherein the inner rotational element is positioned inside the primary structural member; a rotatable magnetic element configured to rotate simultaneously with the inner rotational element; and, a removable lens filter configured to engage in a magnetic connection with the rotatable magnetic element such that the removable lens filter rotates when the external rotational element rotates.

In one embodiment, the rotatable magnetic element is attached to a secondary structural member. In another embodiment, an internal cap seal is provided and configured to keep the primary structural member, the secondary structural member, and the inner rotational element positioned in the system. In one embodiment, the attachment ring is threaded and configured to attach to a front portion of a camera. In one embodiment, the system is configured to attach to a rectangular filter holder configured to hold rectangular filters, wherein the rectangular filter holder comprises a means for attaching to the flange such that the system is retained in the rectangular filter holder. In yet another embodiment, the plurality of ridges is equally spaced and extends on an entire circumference of the external rotational element. In one embodiment, the removable lens filter is configured to be removed from the magnetic lens filter system via pressure without rotation. In one embodiment, the external rotational element includes a number of protrusions configured to engage with a number of grooves positioned on the primary structural member.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a magnetic lens filter system.

Figure 1:
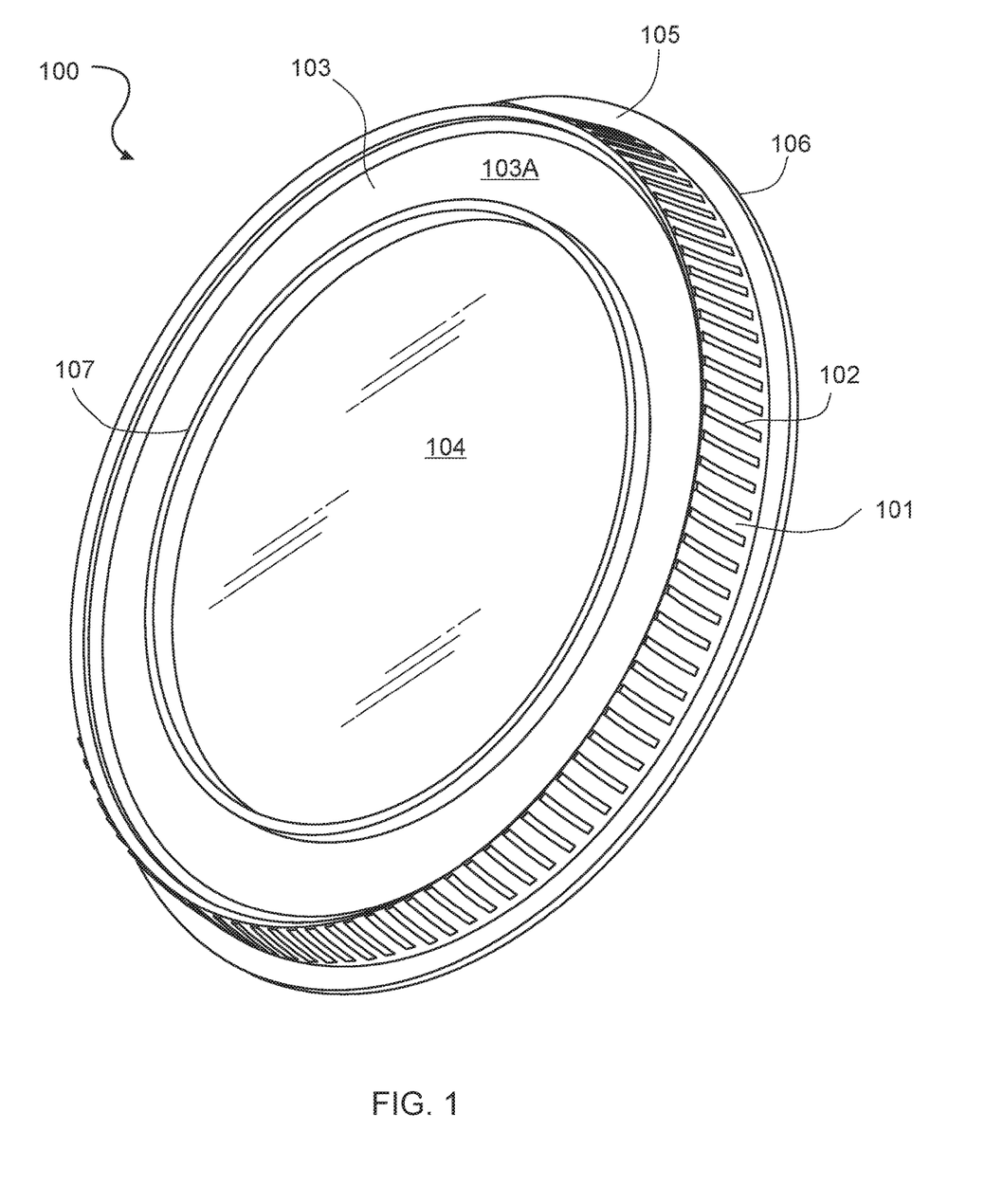
FIG. 1 is a front perspective view of a magnetic lens filter system according to an embodiment of the present invention.
Figure 2:
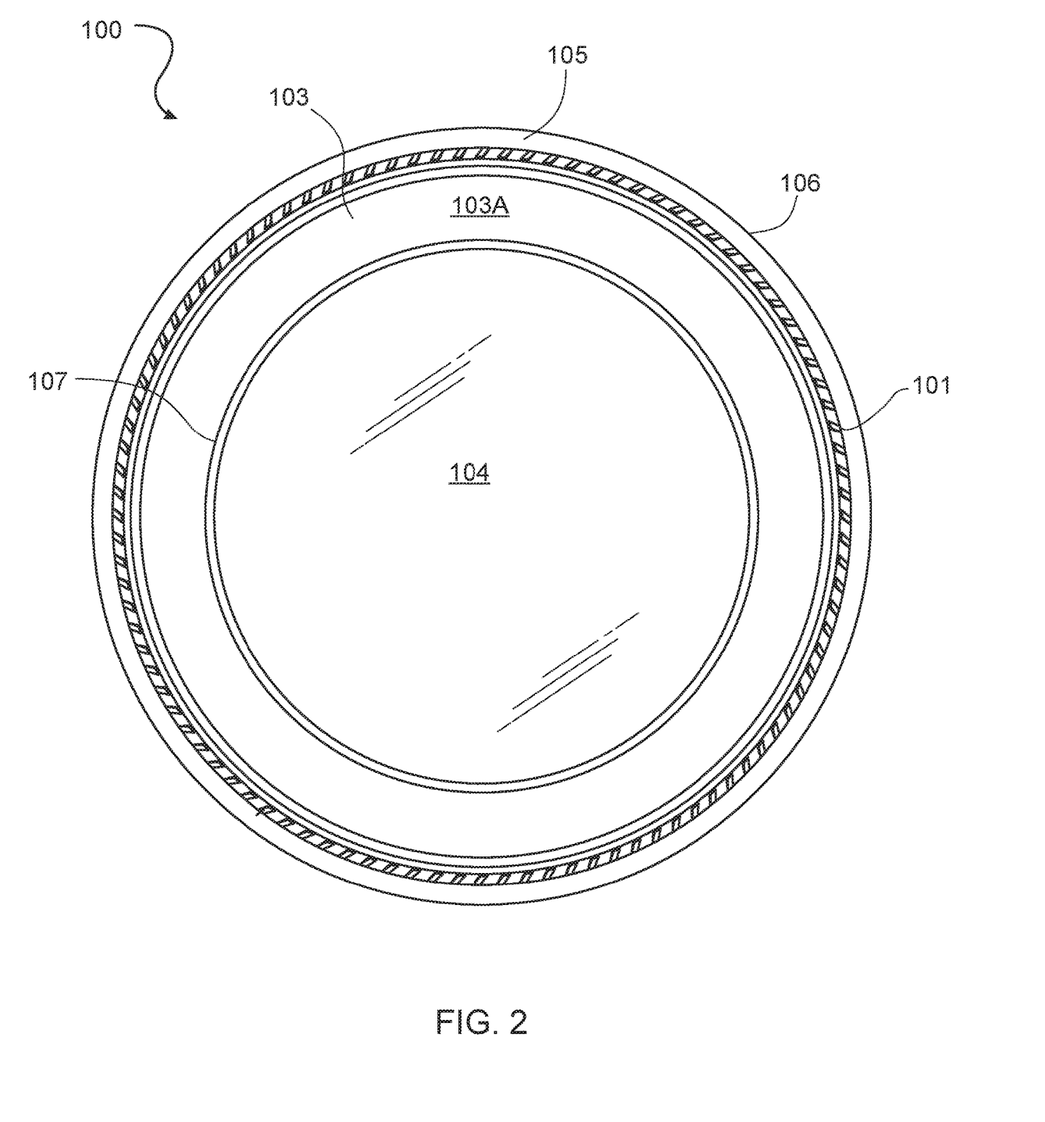
FIG. 2 is a top view of the magnetic lens filter system according to an embodiment of the present invention.

FIGS. 1-2 are various views of a magnetic lens filter system 100 according to an embodiment of the present invention. Referring now to FIGS. 1-2, the magnetic lens filter system is illustrated. The magnetic lens filter system comprises an external rotational element 101 having a plurality of ridges 102, wherein the plurality of ridges are equally spaced and extend the entire circumference of the external rotational element. In one embodiment, the magnetic lens filter system comprises a primary structural member 103, having a top surface 103A, and attachment ring 107. In one embodiment, the top surface is configured to receive indicia, such as brand information and lens filter size. In one embodiment, the attachment ring is threaded and configured to attach to a front portion of a camera adjacent to a camera lens (not illustrated). The connection is typical for a lens filter adapter ring or step-up ring as well known in the art.

Also visible in FIGS. 1-2 is lens filter 104. The lens filter, also called a camera lens filter or photography filter is configured to modify the images captured with a camera, including enhancing color, reducing reflections, or aiding in capturing scenery in extremely difficult lighting conditions as well known in the art. It is a particular advantage of the present invention to provide a magnetic lens holder 104A (best seen in FIG. 6). The magnetic lens holder is configured to hold the lens filter 104, and may be provided in a variety of sizes. Likewise, the lens filter itself may be provided in a variety of sizes and types, such as neutral density, polarizing, UV, etc. In one embodiment, the magnetic lens holder is configured to magnetically attach to magnetic element 121 which is attached to a secondary structural member 120 (best seen in FIG. 3A and FIG. 6). Advantageously, the lens filter is removable and configured to be removed from the magnetic lens filter system via pressure without rotation.

Figure 3A:
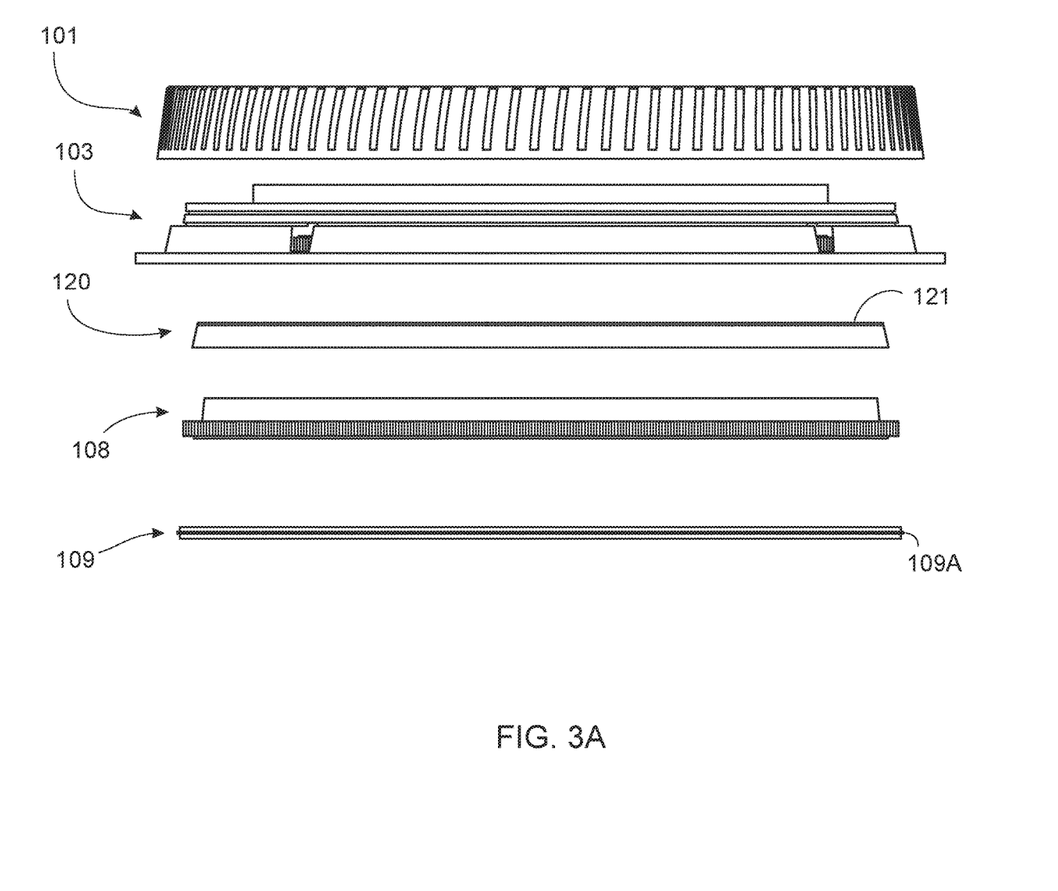
FIG. 3A is a side exploded view of the magnetic lens filter system with the lens filter removed according to an embodiment of the present invention.

FIG. 3A is a side exploded view of the magnetic lens filter system according to an embodiment of the present invention. Referring now to FIG. 3A, the components of the magnetic lens filter system are illustrated, including external rotational element 101, primary structural member 103, secondary structural member 120, inner rotational element 108, and internal cap seal 109.

Figure 3B:
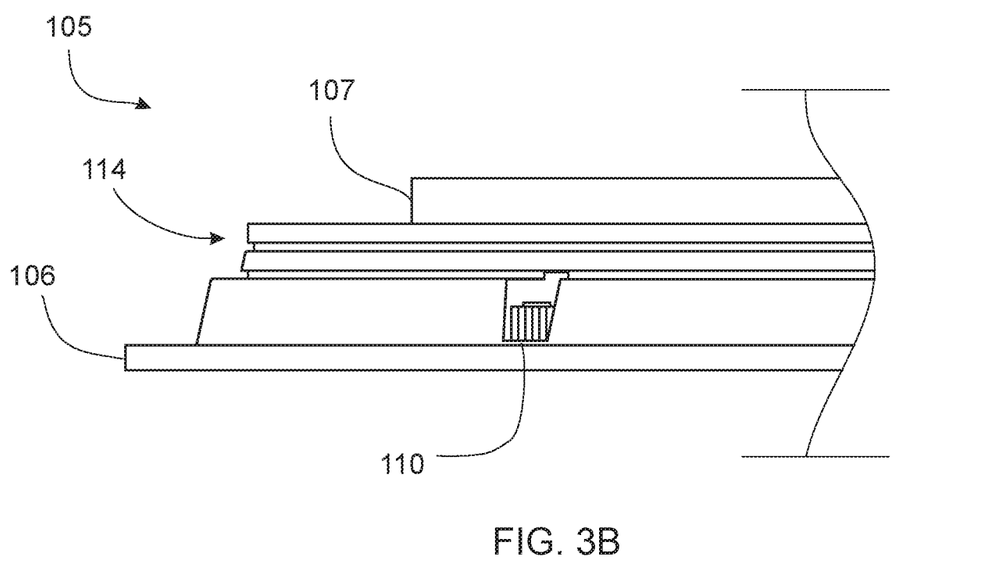
FIG. 3B is a detailed view of the primary structural member of FIG. 3A.

Referring now to FIG. 3B, a detailed side view of the primary structural member is illustrated. As previously mentioned, the primary structural member includes attachment ring 107 configured to connect the magnetic lens filter system to a camera. In one embodiment, the primary structural member includes flange 106, wherein the flange is used as a connection element for an optional rectangular filter holder. This will be described in greater detail below.

In one embodiment, the primary structural member comprises a plurality of gears 110. The gears are a critical aspect of the operation of the system. The gears extend the rotation from the external rotating element to the internal rotation element, which then rotates the lens filter. During operation, when using a lens filter, rotating the filter during use may provide various filter conditions desired for photography as well known in the art. The gears allow for this rotation easily without the need of a threaded engagement typical of other systems. Further, the combination of the gears and the plurality of ridges allows for precise adjustment without much resistance, while the lens filter is securely positioned inside the system via the magnetic connection.

Figure 3C:
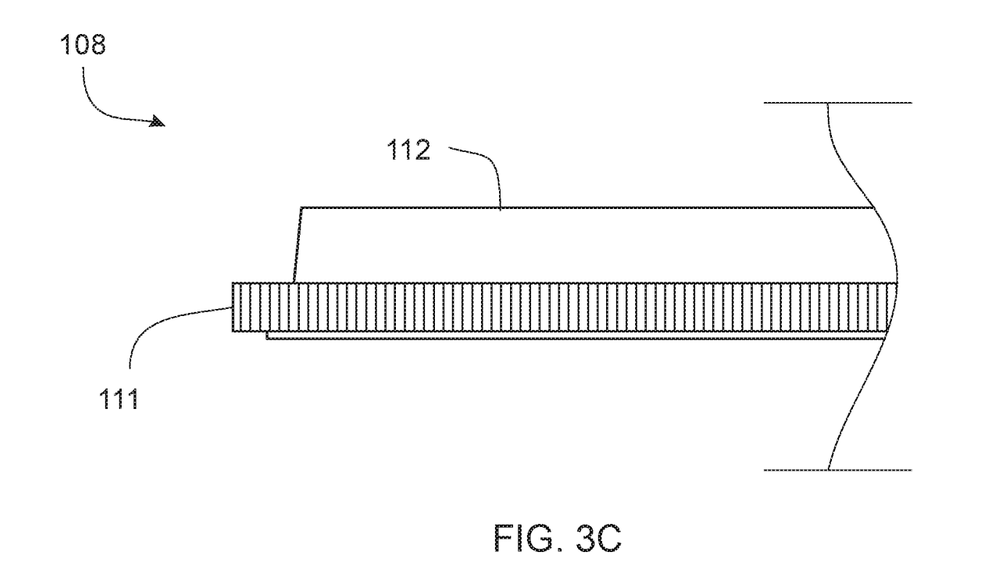
FIG. 3C is a detailed view of the magnetic filter inner rotational element of FIG. 3A.

Referring now to FIG. 3C, inner rotational element 108 is illustrated. In one embodiment, the inner rotational element comprises inner gear 111 and rotational structure member 112. During operation, when a user rotates the external rotational element, the rotation is transferred to the plurality of gears, which transfers to the rotation to the inner gear rotating the rotational structure member. The rotational structure member is engaged with the secondary structural member, which is attached to magnetic element 121. When a user places a lens filter 104 inside the magnetic lens filter system, magnetic lens holder 104A is in magnetic connection with magnetic element 121, thus the lens filter rotates when the external rotational element rotates. In one embodiment, the lens filter rotates the opposite direction of the rotation of the external rotational member.

Figure 4A:
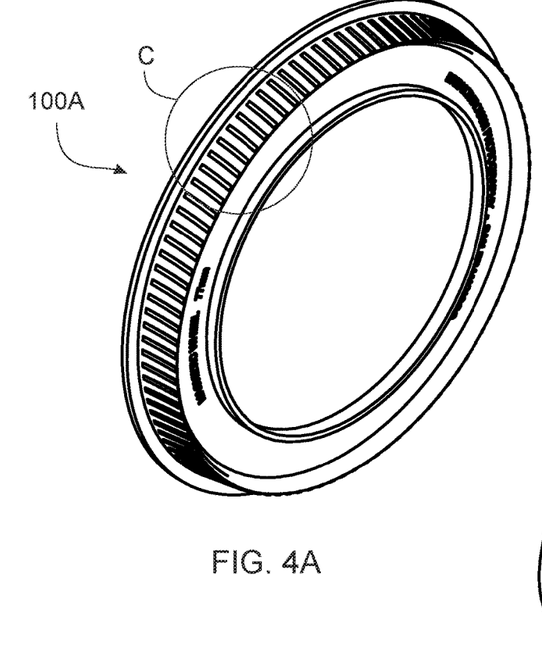
FIGS. 4A-B are front and rear perspective views of a magnetic lens filter system with the lens filter removed according to an embodiment of the present invention.
Figure 4B:
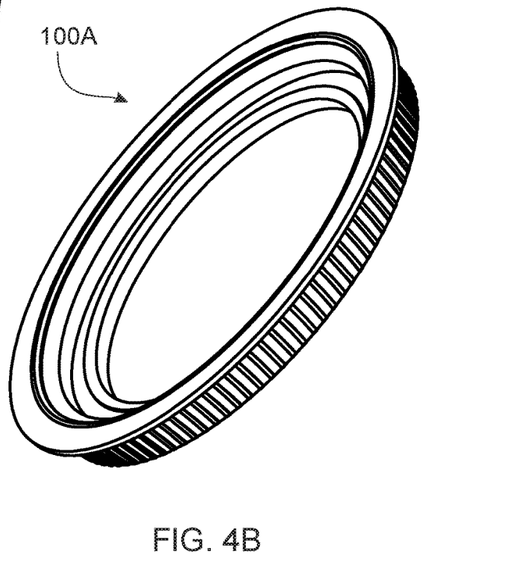
Figure 4C:
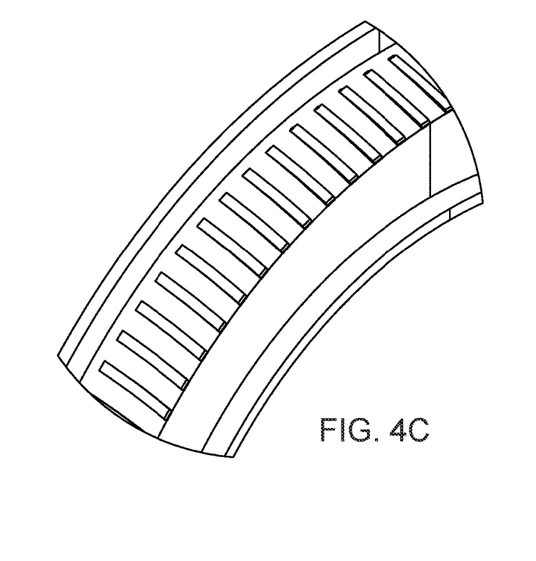
FIG. 4C is a detail of C of FIG. 4A.

Referring now to FIGS. 4A-C, perspective views and a detailed view of the magnetic lens filter system with the lens filter removed 100A are illustrated. In FIG. 4A, an example of the aforementioned indicia positioned on the top surface of the primary structural member is shown.

Figure 5A:
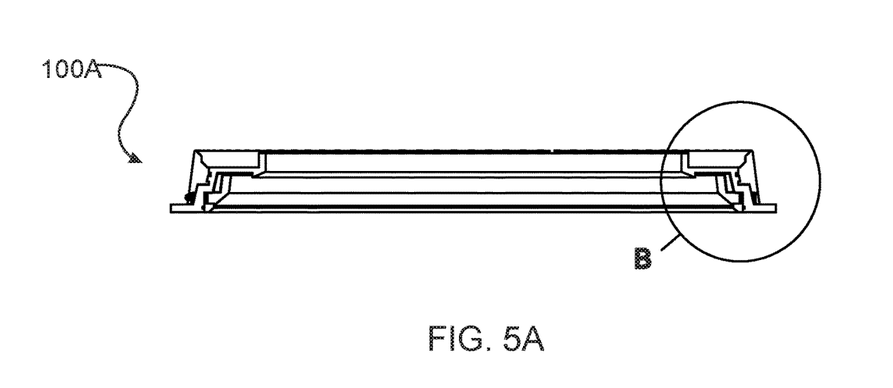
FIG. 5A is a sectional view of the magnetic lens filter system with the lens filter removed according to an embodiment of the present invention.
Figure 5B:
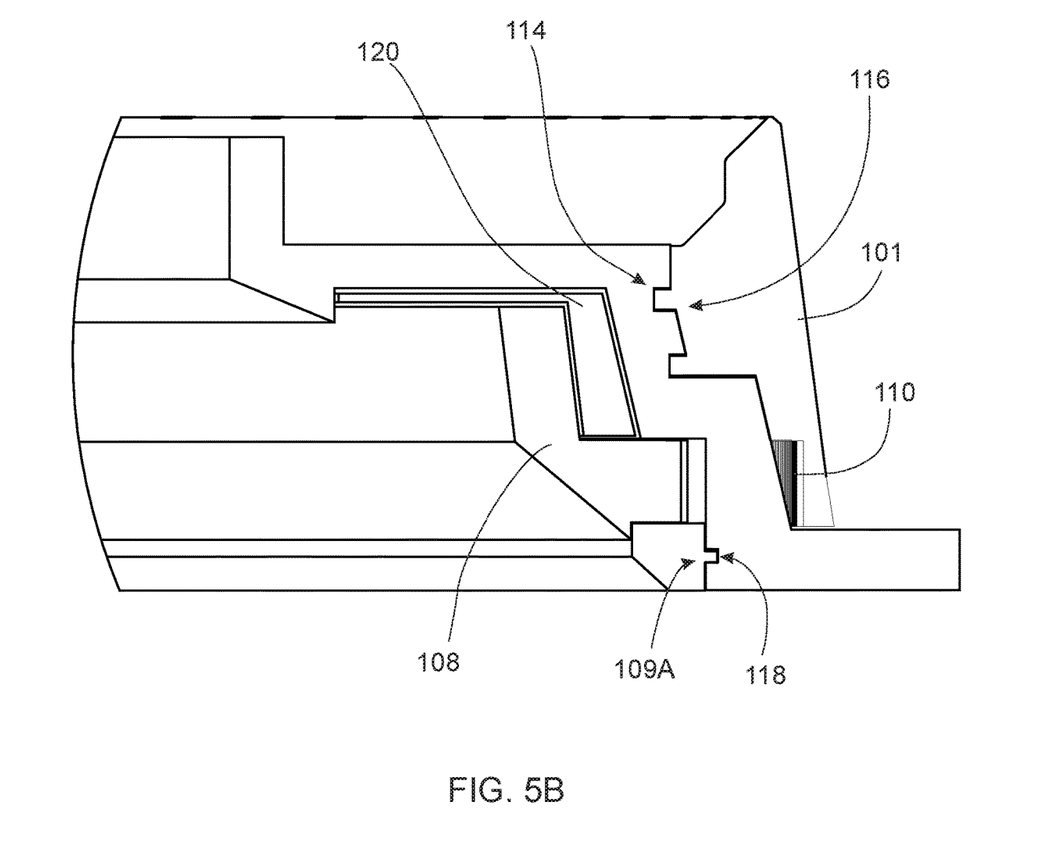
FIG. 5B is detail of B of FIG. 5A.

Referring now to FIG. 5B, a detailed sectional view of the magnetic lens filter system with the lens filter removed 100A is illustrated. In this view, the engagement between the external rotational element and the primary structural member is shown. Specifically, the external rotational element includes a number of protrusions 116 configured to engage with a number of grooves 114 positioned on the primary structural member. Similarly, internal cap seal 109 includes a protrusion 109A configured to engage a lower groove 118 on the primary structural member. In one embodiment, the internal cap seal is designed to keep all the structural components of the magnetic lens filter system in position.

Figure 6:
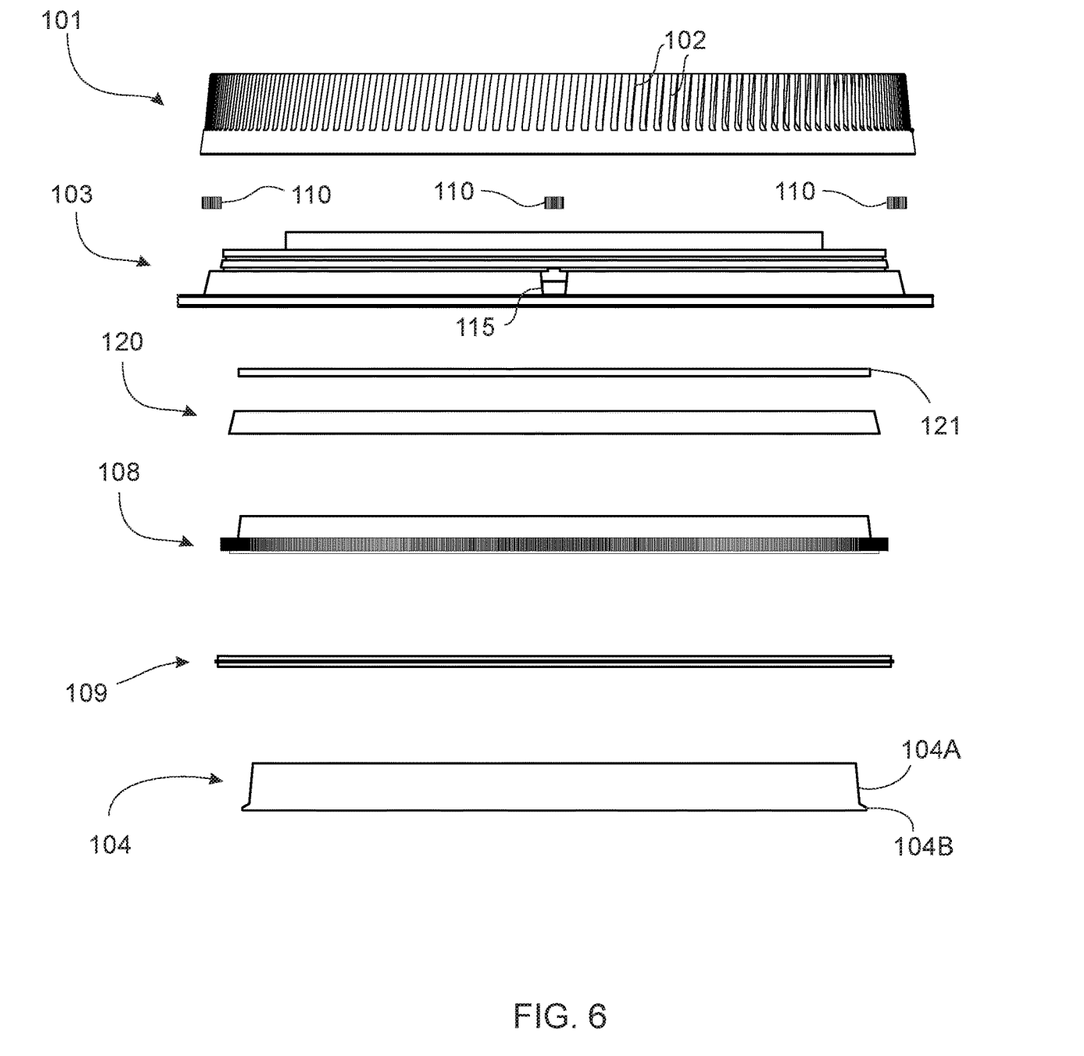
FIG. 6 is a side exploded view of the magnetic lens filter system with a lens filter according to an embodiment of the present invention.
Figure 7A:
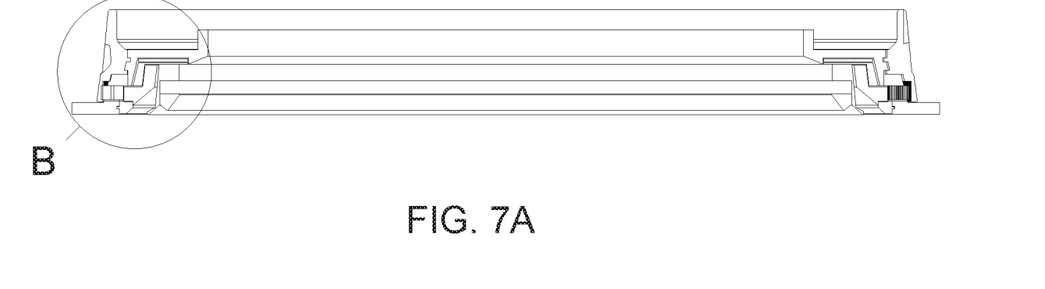
FIG. 7A is a sectional view of the magnetic lens filter system with the lens filter according to an embodiment of the present invention.
Figure 7B:
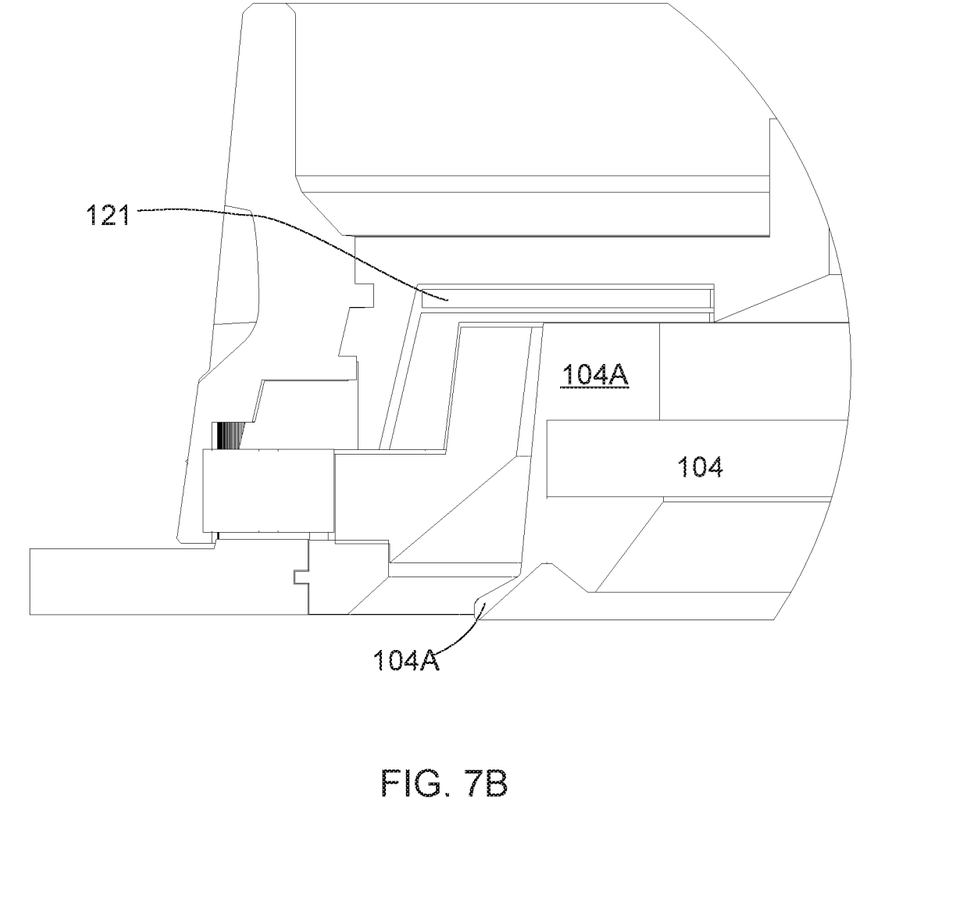
FIG. 7B is detail of B of FIG. 5A.

Referring now to FIG. 6, a side exploded view of the magnetic lens filter system with a lens filter 104 is illustrated. In this figure, the plurality of gears is exploded from the primary structural member, and gear positioning structure 115 is visible on the primary structural member. In one embodiment, the plurality of gear is three gears (the other two gear positioning structures are not visible in this view). In this figure, magnetic element 121 is exploded from the secondary structural member 120. Further in this figure, a side view of lens filter 104 and magnetic lens holder 104A is shown. In one embodiment, the magnetic lens holder comprises lip 104B. FIG. 7B illustrates the sectional profile of the lens filter.

Figure 8:
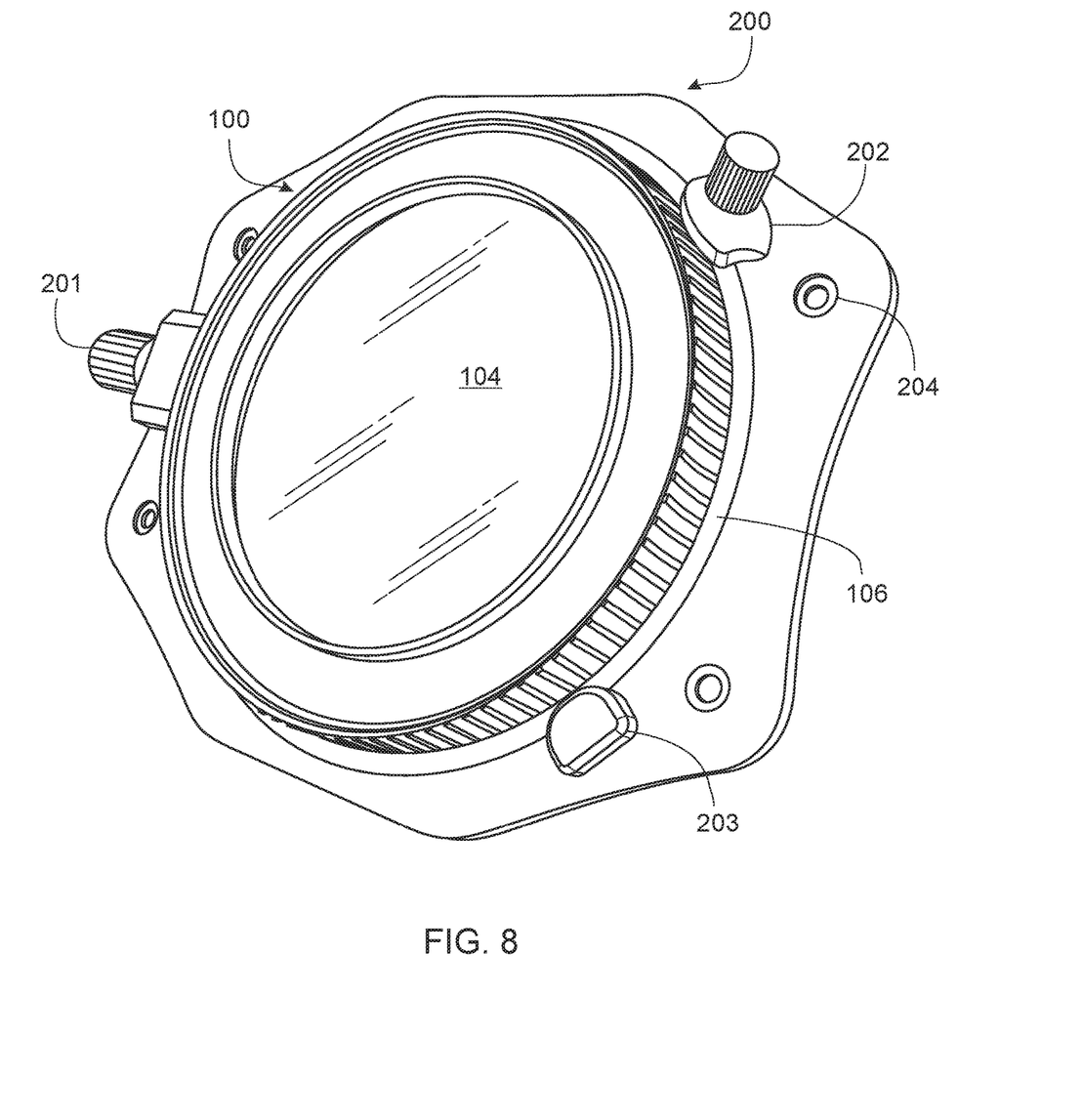
FIG. 8 is a perspective view of the magnetic lens filter system attached to a rectangular filter holder.
Figure 9:
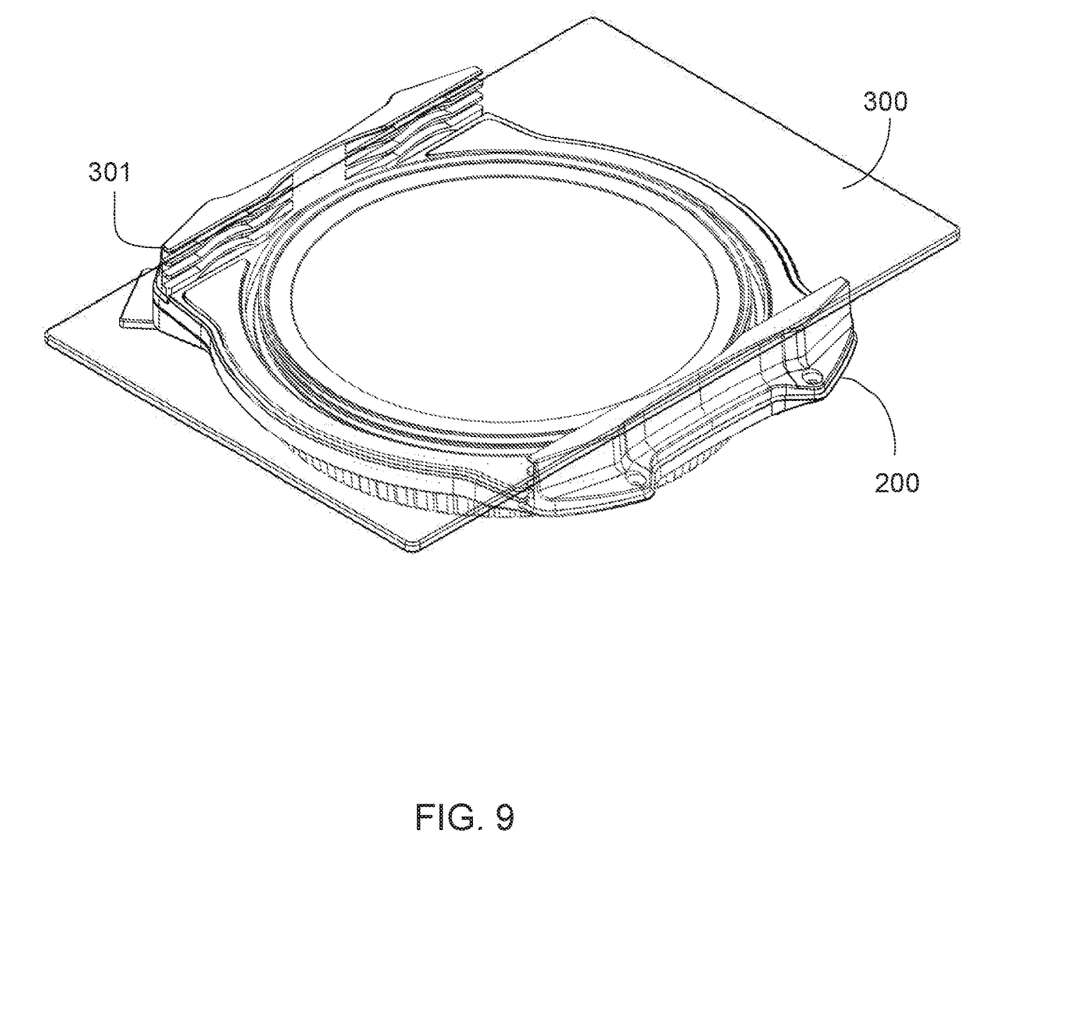
FIG. 9 is a bottom perspective view of the magnetic lens filter system attached to a rectangular filter holder.

FIGS. 8 and 9 are perspectives views of the magnetic lens filter system 100 with lens filter 104 attached to a rectangular 200 filter holder. Referring now to FIGS. 8 and 9, optionally during use, the rectangular filter holder is configured to hold the magnetic lens filter system. In one embodiment, the rectangular filter 300 is a graduated neutral density filter. Advantageously, the graduated neutral filter enables a photographer to use a variable light transmission to capture a desired image, such as darkening a bright sky as well known in the art. In one embodiment, the rectangular filter holder comprises a removable engagement clip 201, screw 202, engagement clip 203, and holes 204. The combination of the removable engagement clip, the screw, and the engagement clip retains the magnetic lens filter system in the rectangular filter holder. This combination is a means for attaching the magnetic lens filter system to the rectangular filter holder. Specifically, engagement clip retains flange 106 of the primary structural member, the screw is rotatable, thus a pressure can be applied on the flange, and the removable engagement clip is biased in a closed position retaining the magnetic lens filter system in the rectangular filter holder. When the magnetic lens filter system is desired to be removed, a user unscrews screw 202 and pulls the removable engagement clip freeing the engagement off the flange allowing the user to remove the magnetic lens filter system. In one embodiment, the holes enable a user to position the rectangular filter holder members 301 which are configured to grip the graduated neutral filter. In one embodiment, more than one rectangular filter may be used with the rectangular filter holder.

Although the invention has been described in considerable detail in language specific to structural features, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A magnetic lens filter system comprising:
   a primary structural member including an attachment ring and a flange;
   an external rotational element having a plurality of ridges, the external rotational element attached to the primary structural member;
   a plurality of gears positioned in a plurality of gear positioning structures provided in the primary structural member, wherein the plurality of gears is in engagement with the external rotational element;
   an inner rotational element having an inner gear in engagement with the plurality of gears such that when the external rotational element is rotated the inner rotational element rotates, wherein the inner rotational element is positioned inside the primary structural member;
   a rotatable magnetic element configured to rotate simultaneously with the inner rotational element; and,
   a removable lens filter configured to engage in a magnetic connection with the rotatable magnetic element such that the removable lens filter rotates when the external rotational element rotates.

2. The magnetic lens filter system of claim 1, wherein the rotatable magnetic element is attached to a secondary structural member.

3. The magnetic lens filter system of claim 2, further comprising an internal cap seal configured to keep the primary structural member, the secondary structural member, and the inner rotational element positioned in the system.

4. The magnetic lens filter system of claim 1, wherein the attachment ring is threaded and configured to attach to a front portion of a camera.

5. The magnetic lens filter system of claim 1, wherein the system is configured to attach to a rectangular filter holder configured to hold rectangular filters.

6. The magnetic lens filter system of claim 1, wherein the plurality of ridges is equally spaced and extends on an entire circumference of the external rotational element.

7. The magnetic lens filter system of claim 1, wherein the removable lens filter is configured to be removed from the magnetic lens filter system via pressure without rotation.

8. The magnetic lens filter system of claim 1, wherein the external rotational element includes a number of protrusions configured to engage with a number of grooves positioned on the primary structural member.

\* \* \* \* \*